CONTROL DEVICE FOR A FILTER CIRCUIT FOR A STATIC INVERTER

Filed Aug. 22, 1968

INVENTOR.
HEINE MARTENSSON
BY
MARTIN TVETERAS
Jennings Bailey, Jr.

United States Patent Office 3,501,686
Patented Mar. 17, 1970

3,501,686
CONTROL DEVICE FOR A FILTER CIRCUIT FOR A STATIC INVERTER

Martin Tveteras and Heine Martensson, Ludvika, Sweden, assignors to Allmänna Svenska Elektriska Aktiebolaget, Vasteras, Sweden Continuation-in-part of application Ser. No. 537,198, Mar. 24, 1966. This application Aug. 22, 1968, Ser. No. 754,613
Int. Cl. H02m *1/12*
U.S. Cl. 321—9 6 Claims

ABSTRACT OF THE DISCLOSURE

A static converter station for high voltage is provided with a filter circuit on its A.C. side, which filter circuit includes inductive, capacitive and resistive elements. Switches are arranged for by-pass connection of a part of the filter circuit, the switches being controlled by a relay device controlled by the number of pulses of the station or the harmonic current of the filter circuit.

PRIOR APPLICATIONS

This application is a continuation-in-part of application Ser. No. 537,198, filed Mar. 24, 1966.

BACKGROUND OF THE INVENTION

Field of the invention

The present invention relates to a control device for a filter circuit for the A.C. side of a static converter, preferably for high voltage, which filter circuit comprises inductive, capacitive and resistive elements.

The prior art

Static converters for medium and large powers must generally be provided with some form of filter on the A.C. side. The reason for this is the harmonic currents which the converter transmits to the A.C. network and which can be troublesome for apparatus connected to the network and also for the converter itself and which can cause disturbances on radio and telephone connections. The said harmonics depend on the number of pulses of the converter in that a converter with the number of pulses $p$ gives rise to harmonics with the ordinal number $n=kp\pm1$. The filter consists generally of one or several circuits tuned to the harmonic frequencies which are generated by the converter and a filter for a converter usually comprises a filter circuit for each of the lower harmonics from the converter. Thus the filter comprises by-pass connections for the harmonics so that these pass through the filter instead of being transmitted to the network.

SUMMARY OF THE DISCLOSURE

A device according to the invention is intended for adjusting the characteristics of a filter circuit and the adjustments in question consist of an adjustment of the factor of merit, that is, the relation between the reactance and the resistance in the filter, through short circuiting or by-pass connecting of larger or smaller parts of the filter circuit resistance.

Regarding said adjustment, it is usually desirable to have low resistance in the filter circuits in order to combine good filtering in the filter circuits with low losses. For practical reasons it is not possible, however, to make the resistance too low because the magnification of the filter circuit thereby becomes too high. It has been proven that the component values of the filter circuit can vary with time and temperature, and that the network frequency can vary, which alterations in connection with very high magnifications of the filter can mean that the filter circuit will become more or less out of resonance. This can have dangerous consequences. In the first place the impedance of the filter increases and thereby also the disturbances. A more dangerous risk is that resonance can occure between the filter and the impedances of the network, which besides further increasing the disturbances can also lead to overloading of the filter due to increase of current. Even if the probability of co-operation of variation in the component values and the network frequency and thus lack of resonance with said dangerous consequences is small, it is not so small that it may be disregarded in dimensioning the filter and this small probability will determine the highest permissible factor of merit of the filter circuits and thereby also their minimum operating losses.

The present invention makes possible a reduction of said operating losses by changing, depending on the circumstances, the characteristics of the filter circuits in the above way and a device according to the invention is characterized by a switching device for by-pass connecting a part of a filter circuit, which switching device is controlled from a characteristic of the converter or the filter circuit, such as, for example the number of pulses or the harmonic current of the filter.

BRIEF DESCRIPTION OF THE DRAWING

The invention will be described in more detail with reference to the accompanying drawing, where FIG. 1 shows a static converter station provided with filter circuits according to the invention having means for adjusting filter characteristics depending on the characteristics which are present for each operating case, while

DESCRIPTION OF THE PREFERRED EMBODIMENTS

Figure 1:
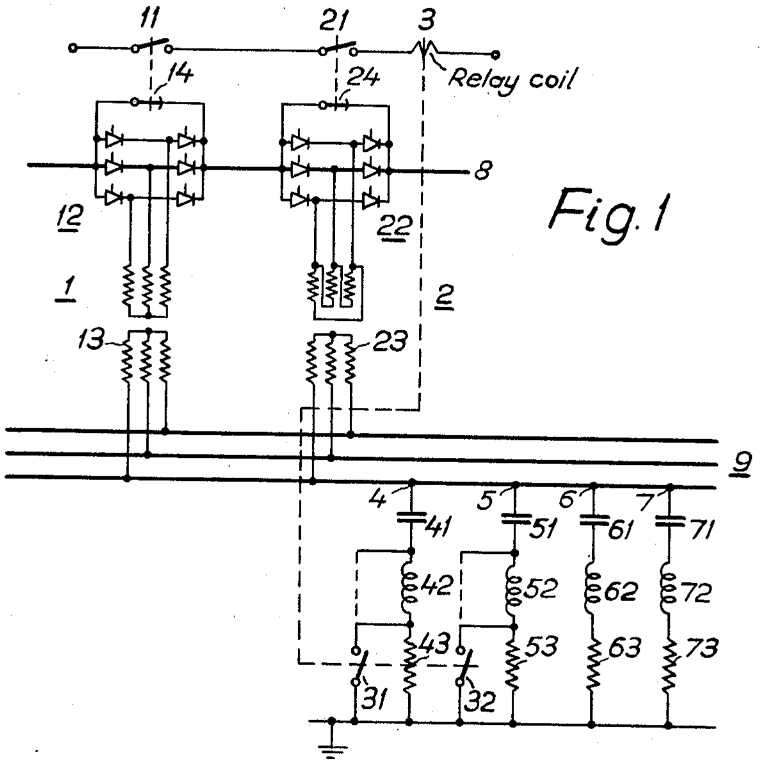

FIG. 1 shows a converter station connected between a D.C. line 8 and an A.C. line 9. The converter station comprises two static converters 1, 2, comprising converter transformers 13 and 23 and rectifier groups 12 and 22. If each converter has its number of pulses equal to 6 and the two converter transformers are phase displaced 30° in relation to each other, the converter station will have the number of pulses equal to 12 in normal operation, that is, with both converters connected. If, on the other hand, one of the converters is by-pass connected, as by short-circuiting members 14, 24 the number of pulses for the station will be reduced to 6.

A harmonic filter is connected between the A.C. network 9 and the earth, which harmonic filter comprises four filter circuits 4–7 tuned for the 5th, 7th, 11th and 13th harmonics. Each filter circuit contains capacitive, inductive and resistive elements which are denoted by the FIGURES 41, 42 and 43, and so on. With the above number of pulses the filter circuits 4 and 5 will be ineffective during normal operation, that is, when the converter station operates with the number of pulses equal to 12. However, said two filter circuits will be effective when one of the converters 1 and 2 in the station is by-pass connected and the number of pulses in the station is thus altered to 6.

With the number of pulses equal to 6, the filter circuits 4 and 5, as mentioned above, must be complete, that is, they must contain the complete resistance required for the above mentioned reasons. During normal operation, that is, when the number of pulses is 12, said two filter circuits, however, will carry very small harmonic currents and it is possible to have a very high factor of merit on the filter without the risk of unallowable disturbances or overloading of the filter. The fundamental frequency current, that is, the current with the fundamental frequency, however, is independent of the number of pulses, so that an increase of the factor of merit means a considerable reduction of the losses of the filter. According to the invention therefore a relay is inserted in series with two contacts 11 and 21 which are closed when the corresponding converter is operative. If, therefore, both the converters are operative, the relay 3 will close so that the contacts 31 and 32 are closed and short circuit the corresponding resistances 43 and 53 in the filter circuits 4 and 5.

Since the reactors 42 and 52 in the filter circuits contain a considerable part of the resistance of the filter circuit, it may be desirable, as shown by the broken lines, also to short circuit said reactors with the contacts 31 and 32. Thereupon the capacitors 41 and 51 are used for reinforcing a capacitor battery, not shown, which is connected to the A.C. network, in order to generate a reactive power.

In the case shown the elements of the filter circuit which are to be short circuited are arranged near the earth potential, so that the contacts will also operate at low voltage. It thereby becomes possible to use an ordinary contactor for the short circuiting.

Figure 2:
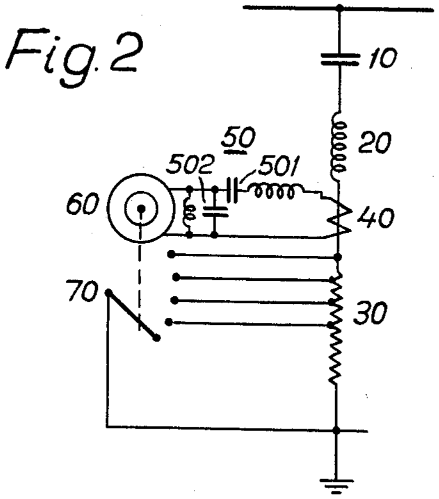
FIG. 2 shows a modified form of filter circuit.

In FIG. 2 another filter circuit according to the invention is shown by means of which the filter resistance can be varied depending on the harmonic current of the filter. This type of filter circuit can replace one or more of the filter circuits of FIG. 1. The filter comprises a capacitor 10, a reactor 20 and a resistance 30. In the filter a current transformer 40 is inserted on whose output side a filter 50 is arranged which only passes the harmonic which the filter is tuned for. A tap switch 70 is driven by a motor 60 connected to the output side of the filter 50, which tap switch is connected to taps on the resistor 30. The tap switch operates in such a way that, if the harmonic current increases, a switch-over to a lower factor of merit will take place, the resistance will be increased, while a switch-over to a higher factor of merit is made if the harmonic current falls below a determined value.

One form of filter is shown more in detail in FIG. 2. The filter 50 is a conventional band-pass filter comprising a series-resonance circuit 501 and a parallel-resonance circuit 502. The output from the filter 50 is connected to a tap switch which could simply be made like a motor 60 influencing the contact arm 70 which in some way is biased in the upward direction, that is against decreasing resistance value of the resistor 30 in FIGURE 2.

If the harmonic current in the filter in FIGURE 2 increases, the output voltage from the filter 50 increases and the motor 60 moves the contact arm 70 downward so that the resistance value of the resistor 30 is increased until the harmonic current is reduced to a suitable value. On the other hand if the harmonic current decreases the biasing of the contact arm 70 will dominate the motor 60 so that the arm 70 is moved upward corresponding to a decreased resistance value in the resistor 30.

What is claimed is:

1. In a static converter station; said static converter station connecting an A.C. network and a D.C. network; a filter circuit connected to said A.C. network; said filter circuit comprising inductive, capacitive and resistive elements; switching means for by-pass connection of a part of said filter circuit; and means responsive to a characteristic of said converter station to control said switching means.

2. In a static converter station as claimed in claim 1; said filter circuit comprising a number of parallel connected filter branches; each filter branch being tuned to a harmonic characteristic for the number of pulses of said converter station.

3. In a static converter station as claimed in claim 2; said station comprising two static converters; each converter being provided with a converter transformer; the converter transformers of said two static converters being phase displaced in relation to each other; the number of pulses of said whole static converter station being twice the number of pulses of each of said two static converters; filter branches tuned for the harmonics corresponding to the number of pulses of said static converters; filter branches tuned for the harmonics corresponding to the number of pulses of said whole station; said switching means being connected in parallel to the resistive elements of said filter branches tuned for the harmonics corresponding to the number of pulses of said static converters.

4. In a static converter station as claimed in claim 3, said switching means also being connected in parallel to the inductive elements of said filter branches.

5. In a static converter station as claimed in claim 3, connecting means for each of said static converters having connected and disconnected positions for the converters; said characteristic-responsive means comprising relay means controlled from said connecting means in such a way that the connected position of both of said converters corresponds to on-position of said relay means.

6. In a static converter station as claimed in claim 1, said switching means comprising a tap switch; and taps in said filter circuit connected to corresponding terminals of said tap switch, a measuring transformer connected on its primary side to said filter circuit, control means for said tap switch, means connecting the secondary side of said measuring transformer to the control means of said tap switch, said connecting means including a further filter circuit connected between said measuring transformer and said control means, said further filter circuit being tuned to the resonance frequency of said first mentioned filter circuit, said tap switch being controlled from said control means with respect to a certain harmonic current value in said first mentioned filter circuit.

References Cited

UNITED STATES PATENTS 2,682,037 6/1954 Bobis et al. -------- 333—76 X
3,290,578 12/1966 Ainsworth ------------ 321—9
3,395,327 7/1968 Kaiser et al. -------- 321—9 X

FOREIGN PATENTS 375,096 5/1923 Germany.

LEE T. HIX, Primary Examiner

W. H. BEHA, Assistant Examiner

U.S. Cl. X.R.

333—76